(12) United States Patent
Bethune

(10) Patent No.: US 6,558,599 B1
(45) Date of Patent: May 6, 2003

(54) METHOD AND APPARATUS FOR MANUFACTURING PAINTED OR VARNISHED PARTS OUT OF MOLDED PLASTICS MATERIAL

(75) Inventor: Alain Bethune, Savigny (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/299,010

(22) Filed: Apr. 26, 1999

(30) Foreign Application Priority Data

Apr. 29, 1998 (FR) .............................. 98 05378

(51) Int. Cl.⁷ .............................. B29C 45/16
(52) U.S. Cl. ............... 264/255; 264/275; 264/297.3; 264/297.8; 264/328.8; 264/342 R; 264/348
(58) Field of Search ................. 264/478, 265, 264/255, 275, 342 R, 348, 328.8, 297.3, 297.8

(56) References Cited

U.S. PATENT DOCUMENTS

| 4,207,049 A | | 6/1980 | Malo et al. | |
|---|---|---|---|---|
| 4,551,387 A | * | 11/1985 | Manabe et al. | 428/336 |
| 5,030,406 A | * | 7/1991 | Sorensen | 264/255 |
| 5,902,534 A | * | 5/1999 | Fujishiro et al. | 264/255 |

FOREIGN PATENT DOCUMENTS

| DE | 24 61 925 A1 | 11/1975 |
|---|---|---|
| DE | 42 38 130 A1 | 5/1994 |
| FR | 2 729 886 A1 | 8/1996 |
| JP | 05162171 A * | 6/1993 |
| WO | WO 95/13177 | 5/1995 |

OTHER PUBLICATIONS

Patent Abstracts of Japan, vol. 12, No. 442 (M–766), Publication No. 63173616, Jul. 1988.
Graff, G., "In–Mold Color Coating Readies for Industry Debut", *Modern Plastics International* 25 (1995) Feb., No. 2, Lucerne, Switzerland, pp. 52–53.
Patent Abstracts of Japan, vol. 007, No. 269 (M–259), Publication No. 58148728, Sep. 3, 1983.

* cited by examiner

*Primary Examiner*—Jan H. Silbaugh
*Assistant Examiner*—Edmund H. Lee
(74) *Attorney, Agent, or Firm*—Oliff & Berridge, PLC

(57) ABSTRACT

A method of making a painted part out of molded thermoplastic material, the method including making the part to be painted by a method of molding thermoplastic material in the cavity of a mold; allowing the part made in this way to cool at least on the surface, cooling being accompanied by shrinkage, and being performed by opening the mold that was used to make the part that is to be painted; and injecting paint around the part in a cavity of a mold having the same shape as the mold cavity that was used for molding the thermoplastic material.

13 Claims, 3 Drawing Sheets

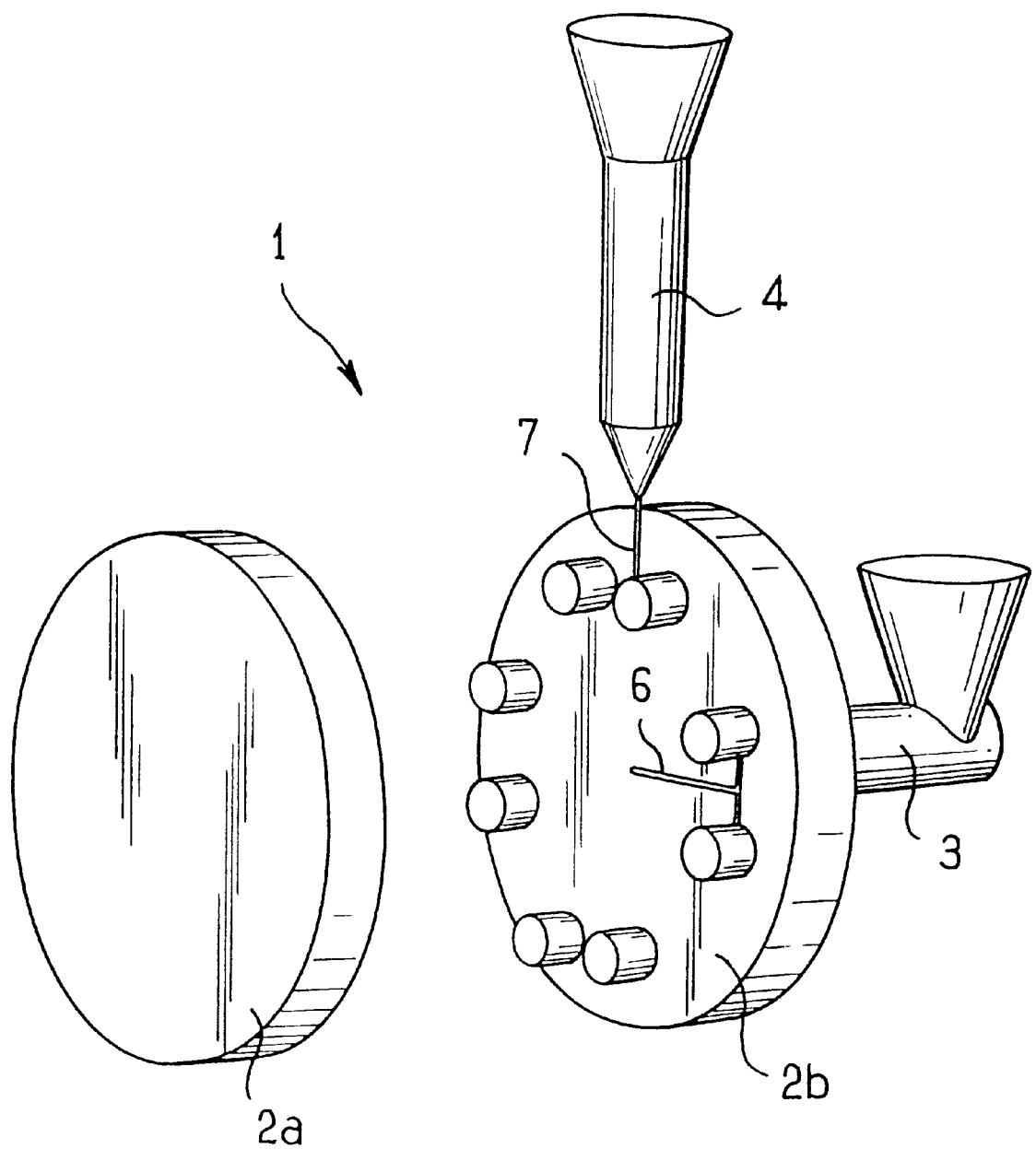
FIG_1

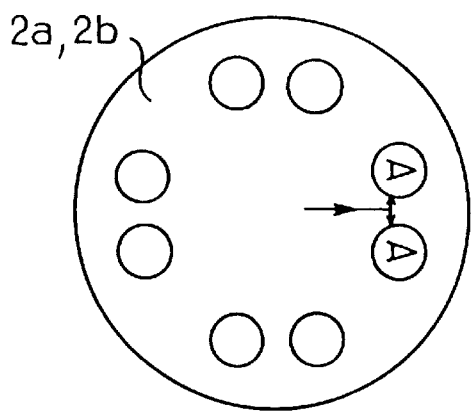
FIG_2
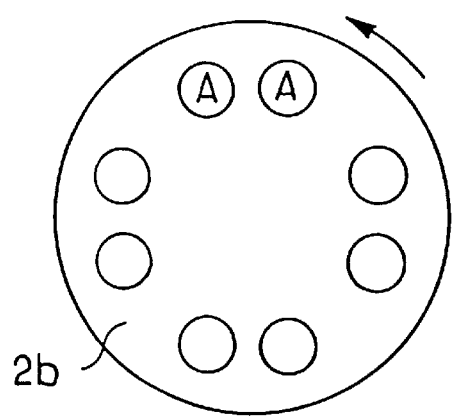
FIG_3
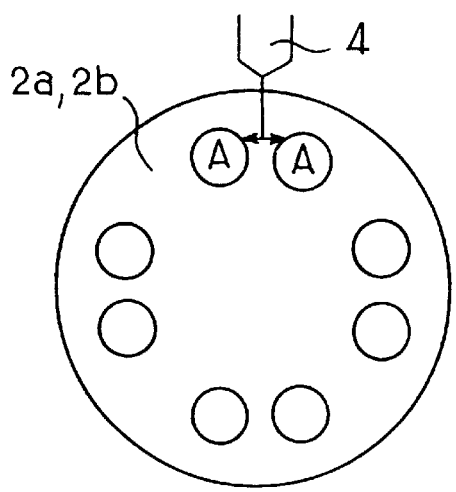
FIG_4
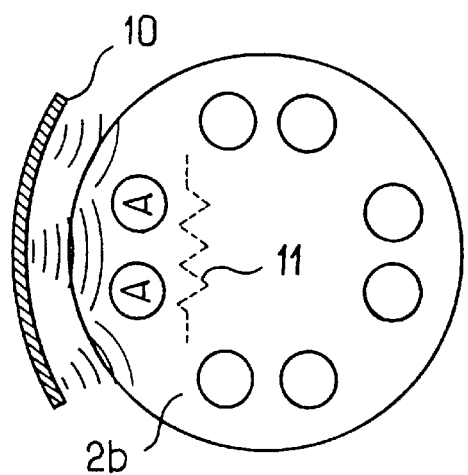
FIG_5
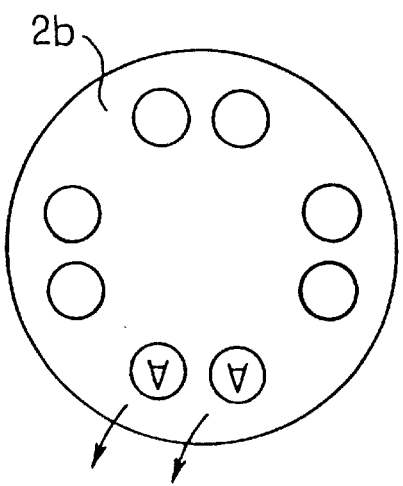
FIG_6

METHOD AND APPARATUS FOR MANUFACTURING PAINTED OR VARNISHED PARTS OUT OF MOLDED PLASTICS MATERIAL

The present invention relates to manufacturing parts by molding thermoplastic material, and more particularly but not exclusively, to manufacturing parts having a surface appearance that is pearly or metallic.

BACKGROUND OF THE INVENTION

To confer a pearly appearance to parts made of molded plastics material, it is known to incorporate an appropriate filler in the plastic.

Nevertheless, the flow lines of the material during molding usually remain visible on the part made in that way, which can be esthetically unpleasing.

Furthermore, the presence of the filler can give rise to problems with the part being fragile.

Also, to give a metallic appearance to parts made of molded plastics material, it is known to subject them to vacuum metallization or to immerse them in an electrolytic bath, but those techniques are relatively expensive to implement.

It is known that parts made of plastics material can be painted by spraying paint or varnish thereon, however that solution remains relatively expensive and can also give rise to environmental problems.

WO 95/13177 discloses a method in which the plastics material is initially injected into a mold cavity, and then the parts constituting the mold are moved relative to each other so as to leave a gap into which paint can be injected. That method requires a mold that is relatively complicated since the displacement of the component parts of the mold must be controlled accurately prior to injecting paint.

FR-A-2 729 886 discloses the method in which the plastics material is initially injected and then, before the core of the part has cooled down completely, paint is injected. The molded part is painted without opening the mold. The still-fluid core of the part is compressible and allows the paint which is injected under pressure to spread around the part. That method is relatively difficult to implement since the capacity for compression of the plastics material depends on the thickness of the non-solidified layer in the core of the part. The shape of the part must therefore be implemented accordingly, thereby complicating design.

OBJECTS AND SUMMARY OF THE INVENTION

The present invention seeks in particular to facilitate the manufacture of parts made of plastics material and that have a special surface appearance, e.g. pearly or metallic.

The invention achieves this by a novel method of making a painted part out of molded thermoplastic material, the method comprising the steps consisting in:

making the part to be painted by a method of molding thermoplastic material in the cavity of a mold;

allowing the part made in this way to cool at least on the surface, cooling being accompanied by shrinkage, and being performed by opening the mold that was used to make the part that is to be painted; and injecting paint around the part in a cavity of a mold having the same shape as the mold cavity that was used for molding the thermoplastic material.

In order to simplify the description, the term "paint" should be understood here and below and in the claims as also extending to varnishes.

By means of the invention, it is possible to obtain a pearly or other surface appearance without any need to add a filler to the thermoplastic material, thereby solving the problems of traces left by the flow lines of the material.

The shrinkage of the thermoplastic material during cooling provides a space inside the mold cavity around the molded part into which paint can be injected.

In addition, the invention makes it possible to remedy the problems of fragility induced by the presence of a filler within the thermoplastic material.

The paint used can also serve to increase scratch resistance by being harder than the plastics material constituting the core of the part.

It is thus very easy to make a part having the looked-for surface appearance by using an appropriate paint.

In particular, it is possible to use a metallized paint and to obtain a molded part having a metallic appearance without it being necessary to perform vacuum metallization.

Furthermore, because of the invention, paint is deposited around the molded part without the environmental problems that are encountered when paint is sprayed.

In a particular implementation of the invention, the part is cooled by being extracted from the mold.

The molded part can be subjected to surface treatment prior to paint being injected, e.g. corona effect treatment to improve the adhesion of the paint on the molded part.

In a particular implementation of the method of the invention, the mold is rotated at least through part of a turn relative both to a feed member for feeding thermoplastic material and to a feed member for feeding paint.

Preferably, the mold has a first set of cavities in which molding of the thermoplastic material takes place, and a second set of cavities in which the paint is injected around the previously-molded part.

In a variant implementation of the method, after the thermoplastic material has been molded, the molded parts are extracted from the mold and transferred to a different mold, where the different mold nevertheless has cavities of the same shape as the cavities that were used for molding said parts.

In a particular implementation of the invention, a paint is used that is cured under the action of ultraviolet radiation, and after the paint has been injected, the mold is opened and the painted part is exposed to ultraviolet radiation.

In a variant implementation of the method, a paint is used that is cured under the action of heat, and after the paint has been injected, it is heated to a temperature higher than its curing temperature.

Preferably, the paint is injected at a temperature less than or equal to 100° C., and preferably the paint is injected cold.

It is also possible to cure the paint by exposing it to an appropriate curing agent, e.g. a peroxide.

The paints used can be based on polyurethane or on epoxy and can contain metallic fillers.

The invention also provides a painted molded part obtained by implementing the above-specified method.

The part can be constituted by a thermoplastic material coated on its surface in a layer of paint deposited by being injected into the mold, and of thickness lying in the range 10 $\mu$m to 150 $\mu$m, and preferably in the range 25 $\mu$m to 50 $\mu$m.

By way of example, the painted molded part can constitute a flask, a stopper, or a box.

The invention also provides apparatus for manufacturing a painted molded part, the apparatus comprising:

a first set of mold cavities;
a second set of mold cavities, the cavities of said first and second sets being identical in shape;
an injector member for injecting thermoplastic material in the molten state into the first set of mold cavities; and
an injector member for injecting paint into the second set of mold cavities around parts previously made by means of the first set of mold cavities.

Compared with spray deposition, the invention makes it possible to reduce paint losses since the paint can be deposited with precisely the required thickness.

In addition, the invention makes it possible to manufacture painted molded parts using a small number of operations and molds that are relatively simple.

When the parts made are flasks or the like, the invention makes it possible to avoid certain problems of chemical compatibility that are encountered with prior art molded parts containing fillers that are not compatible with the composition that is to be contained inside the flask.

The invention makes it possible to use a thermoplastic material that has no filler or coloring agent, that is entirely compatible with the composition that is to be contained inside the flask, while nevertheless obtaining the looked-for external appearance, since there is no risk of the pigments or coloring agents in the paint used coming into contact with the above-mentioned composition.

BRIEF DESCRIPTION OF THE DRAWINGS

The invention will be better understood on reading the following detailed description of a non-limiting implementation, and on examining the accompanying drawings, in which:

FIG. 1 is a diagrammatic perspective view of apparatus for manufacturing painted molded parts in application of the method of the invention, with the mold being shown open;

FIGS. 2 to 6 show various steps in the manufacture of painted molded parts; and

MORE DETAILED DESCRIPTION

Figure 7:
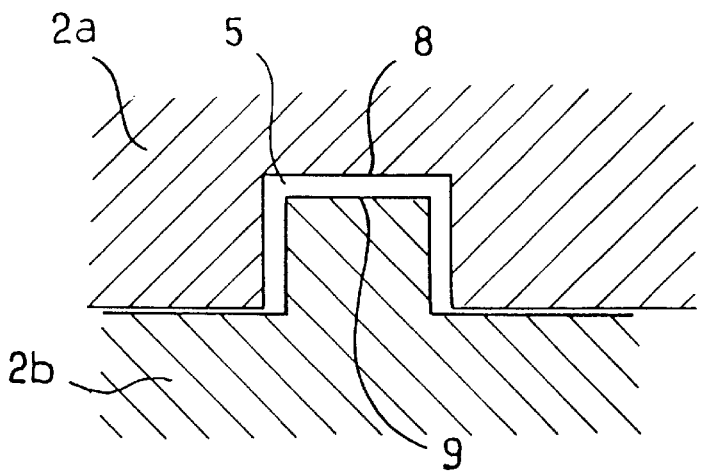
FIGS. 7 to 10 are section views through a mold cavity to illustrate various steps in the manufacture of a painted molded part.

The apparatus 1 shown in FIG. 1 comprises a two-portion rotary mold 2a, 2b, a feed member 3 for feeding the thermoplastic material that is to be molded, and a feed member 4 for feeding the paint.

In the embodiment shown, the mold 2a, 2b is designed to manufacture caps for closing aerosol cans.

Channels 6 are made in the mold 2a, 2b so that when the mold is closed, they lead thermoplastic material in the molten state from the member 3 to the cavities 5 in the mold in which the parts are to be molded.

The cavities 4 are of identical dimensions and they are defined by shapes formed in or on the portions 2a and 2b.

In the example shown, each cavity 5 is defined by the space that exists between a recess 8 in the portion 2a and a projection 9 on the portion 2b which is received inside the recess 8.

A cavity 5 is shown in isolation in FIG. 7.

Mold portion 2b also has channels 7 for use when the mold is closed to bring paint in the liquid state from the member 4 into each cavity 5 around a previously-molded part.

The channels 6 and 7 for feeding and distributing thermoplastic material and paint are shown diagrammatically and in part only in FIG. 1 in order to clarify the drawing.

In the example shown, the mold 2a, 2b has a total of eight identical cavities 5 which are grouped together in pairs so as to form four groups.

The mold is rotated counterclockwise through one-fourth of a turn to go from one group to the next.

In the example described, mold portion 2a is fixed.

Preferably, as shown in FIG. 1, the thermoplastic feed member 3 communicates with the channels 6 from a central region of the mold, while the paint feed member 4 communicates with the channels 7 from the periphery of the mold.

The various steps in making a painted molded part are described below with reference to FIGS. 2 to 10.

Initially, thermoplastic material is injected into the group of cavities that is shown on the right of FIG. 2, for the purpose of making molded parts A.

Figure 8:
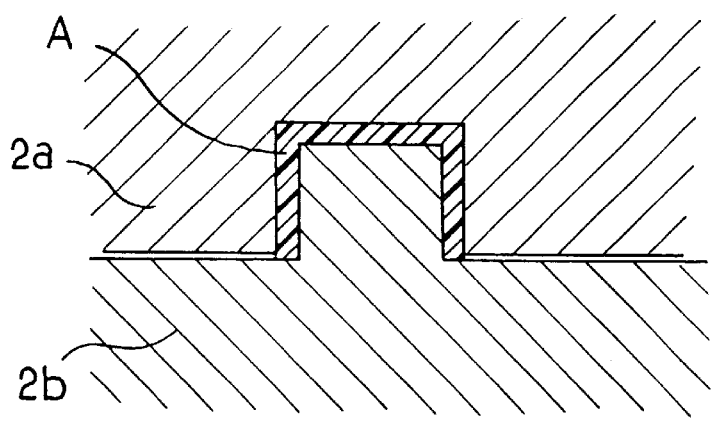

The thermoplastic material then completely fills the corresponding cavities 5, as shown in FIG. 8.

After the thermoplastic material has been injected to make the parts A, the mold is opened and then rotated through one-fourth of a turn, as shown in FIG. 3.

The molded parts A are then at the top in FIG. 4.

As they cool, they shrink.

By opening the mold, it is possible to ensure that the outside surface of the part that is to be painted no longer adheres to the mold since otherwise that could impede subsequent distribution of paint around the part.

Figure 9:
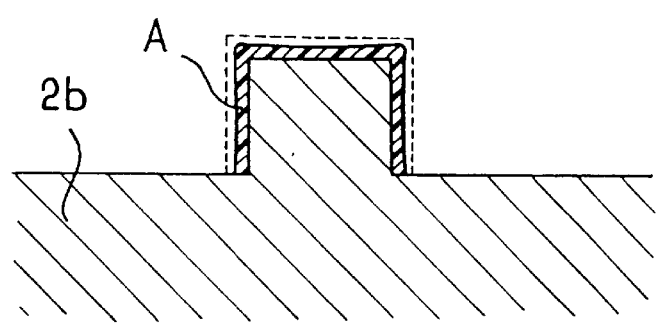

FIG. 9 uses dashed lines to show the initial shape of the parts A prior to cooling.

The parts are preferably cooled sufficiently to ensure that the core of each part is hard and shrinkage is at its maximum, or nearly.

Opening the mold also makes it possible to perform corona effect treatment, for example, in order to improve the adhesion of the paint.

Figure 10:
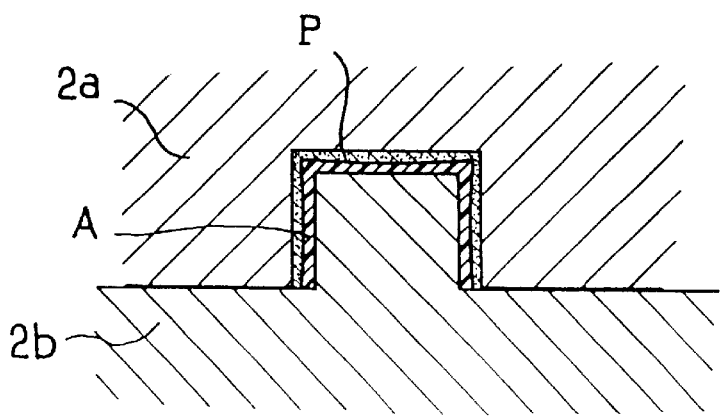

The mold is then reclosed, and paint P is injected around the molded parts A that have been subjected to shrinkage associated with cooling of the thermoplastic material, as shown in FIG. 10.

In the example described, the paint P used is cured under the action of ultraviolet radiation produced by an ultraviolet generator 10.

The mold is opened after the paint has been injected into the cavities 5 and is then turned through one-fourth of a turn, and the painted parts A which are on the left in FIG. 5 are exposed to ultraviolet radiation, thereby curing the paint.

In a variant, if the paint used is a paint that cures under the action of heat, then, after the paint has been injected, the parts A are raised to a temperature higher than the curing temperature of the paint, e.g. by means of an electrical resistance 11 represented schematically by dashed lines in FIG. 5, or else by means of a hot fluid circulating in the mold.

After the paint has cured, the parts A are ejected on the following one-fourth turn of the mold, as represented by arrows in FIG. 6.

It is preferable to use a rotary mold as described above so as to perform the operations of injecting thermoplastic material and of injecting paint simultaneously.

In other words, parts are being molded in a first group of cavities while other parts are being painted in a second group of cavities.

Naturally, the invention is not limited to the examples described above.

In particular, instead of using a rotary mold, it is possible to use a first mold having cavities into which the thermoplastic material is injected, and a second mold having cavities into which the paint is injected, with the unpainted molded part being transferred from one mold to the other by any suitable means.

What is claimed is:

1. A method of making a painted part out of molded thermoplastic material, the method comprising:

molding a thermoplastic material in a first cavity of a mold in order to form said part, said part having a surface;

opening said mold and allowing said part to cool at least on said surface, the cooling being accompanied by shrinkage; and injecting paint in a second cavity of said mold containing said part, said second cavity having the same dimensions as the first cavity used for molding.

2. A method according to claim 1, wherein the part is cooled by being extracted from said mold.

3. A method according to claim 1, wherein the molded part is subjected to surface treatment prior to injecting the paint.

4. A method according to claim 1, wherein said mold is rotated at least through part of a turn relative both to a feed member for feeding thermoplastic material and to a feed member for feeding paint.

5. A method according to claim 1, wherein said mold has a first set of cavities in which molding of the thermoplastic material takes place, and a second set of cavities in which the paint is injected around the previously-molded part.

6. A method according to claim 1, wherein a paint is used that is cured under the action of ultraviolet radiation, and wherein, after the paint has been injected, the mold is opened and the painted part is exposed to ultraviolet radiation.

7. A method according to claim 1, wherein a paint is used that is cured under the action of heat, and wherein, after the paint has been injected, said paint is heated to a temperature higher than the curing temperature of said paint.

8. A method according to claim 1, wherein said paint is injected at a temperature less than or equal to 100° C.

9. A method according to claim 8, wherein said paint is injected cold.

10. A method according to claim 1, wherein said surface of the part is deprived of injection point.

11. A method according to claim 1, wherein said molded part is a stopper.

12. A method according to claim 1, wherein said molded part is hollow and has only one cavity.

13. A method according to claim 1, wherein the paint extends on a continuous surface of said part.

\* \* \* \* \*